July 24, 1956 R. W. GILBERT 2,755,704
PHOTOGRAPHIC EXPOSURE-DETERMINING APPARATUS
Filed Sept. 18, 1952 2 Sheets-Sheet 1

ROSWELL W. GILBERT
INVENTOR.

BY
Gaylor, Cifelli & Lurick
ATTORNEYS

July 24, 1956   R. W. GILBERT   2,755,704
PHOTOGRAPHIC EXPOSURE-DETERMINING APPARATUS
Filed Sept. 18, 1952   2 Sheets-Sheet 2
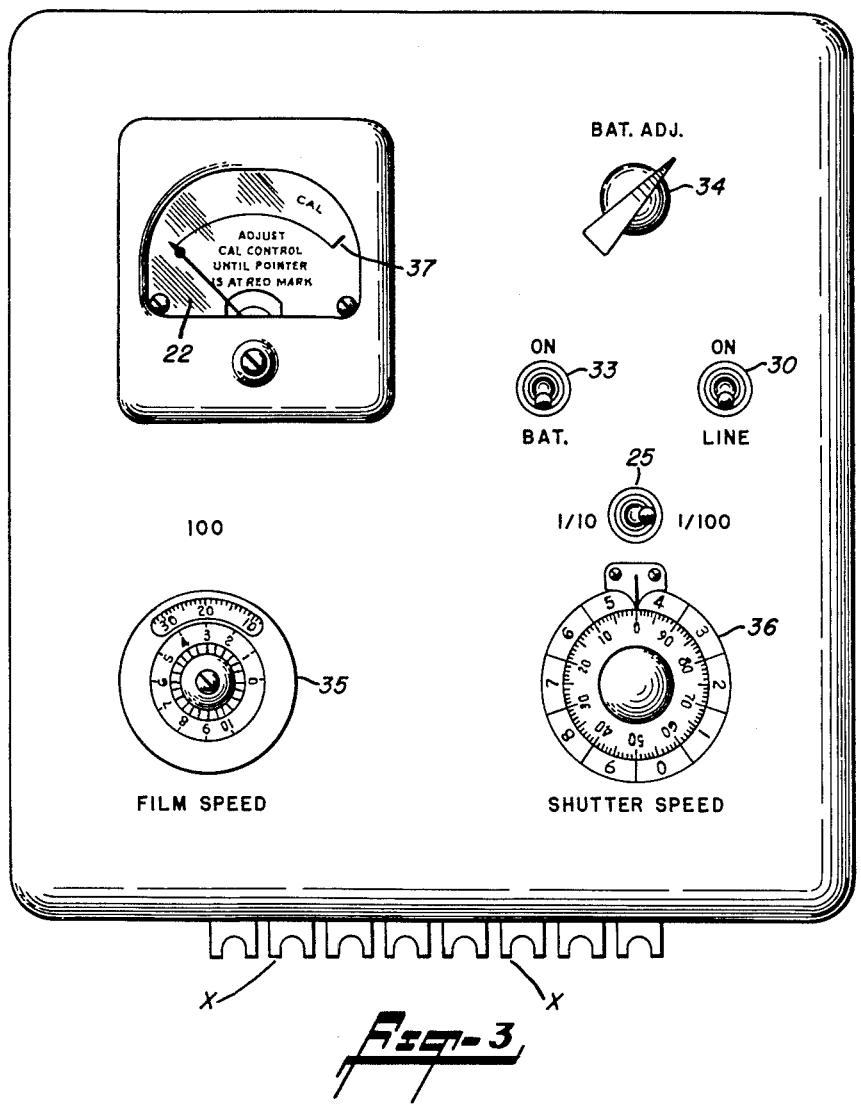
F̵ig-3
ROSWELL W. GILBERT
INVENTOR.
BY
ATTORNEYS

United States Patent Office 2,755,704
Patented July 24, 1956

2,755,704

PHOTOGRAPHIC EXPOSURE-DETERMINING APPARATUS

Roswell W. Gilbert, Montclair, N. J., assignor to Weston Electrical Instrument Corporation, Newark, N. J., a corporation of New Jersey Application September 18, 1952, Serial No. 310,305

1 Claim. (Cl. 88—23)

This invention relates to photographic exposure-determining apparatus and more particularly to an exposure meter useful for determining the amount of light available for photographic purposes in order that a correct exposure of the photographic film is obtained to produce a picture of desired tonal and contrast characteristics.

Exposure meters of the type including a current-generating photocell, a milliammeter forming a brightness meter, and a calculator for correlating the measured scene brightness with other exposure factors (such as, film speed, camera diaphragm opening and shutter speed) are well known in the art. The present invention is directed to an exposure meter, of this general class, which is particularly adapted for interpreting film-plane illumination into correct exposure conditions. In brief, my novel exposure-determining apparatus comprises a photocell, a reference current source and a balanced calculator network whereby the quantity of light striking a film plane is converted directly into proper exposure factors upon balancing the network by means of calibrated resistance members.

While my invention is useful in any arrangement wherein the light measurements are made in the same plane as that of the photographic film, the invention will be described with specific reference to the metallograph, a device used in photo-micrography. The use of my invention in connection with such device facilitates color photography which is often desired as an additional contrast dimension in photo-micrography.

An object of this invention is the provision of novel exposure-determining apparatus for use in that branch of photographic art wherein the photographic film is exposed in accordance with the intensity of the light available in the plane of the film emulsion.

An object of this invention is the provision of film-plane photographic exposure apparatus comprising a photocell, a reference current source and a balancing calculator network for interpreting film-plane illumination into exposure terms.

An object of this invention is the provision of photographic exposure-determining apparatus comprising a photocell adapted for placement in the plane of a photographic film, a source of reference current, a balancing network including a series-shunt resistance current-attenuator wherein the shunt parameter is calibrated in terms of the reciprocal of exposure time and the series parameter is calibrated in terms of film speed, and current-responsive means for indicating a balanced condition of the network.

An object of this invention is the provision of apparatus for establishing the correct exposure conditions for a photographic film, said apparatus comprising a photocell responsive to the light intensity at the film emulsion; a fixed current source; a first rheostat having a dial calibrated in terms of the reciprocal of exposure time, said rheostat having one end connected to one side of the photocell and one side of said source, the other end connected to the other side of the photocell and a movable arm connected to the other side of said source; a second rheostat having a dial calibrated in terms of film speeds and connected between said other side of the photocell and said other end of the first rheostat; and a galvanometer connected across the photocell, the correct exposure conditions being indicated when the voltage across said galvanometer is zero.

These and other objects and advantages will become apparent from the following description when taken in connection with the accompanying drawings. It will be understood the drawings are for purposes of illustration and are not to be construed as defining the scope or limits of the invention, reference being had for the latter purpose to the appended claim.

The drawings wherein like reference characters denote like parts in the several views:

Figure 3 shows the front panel of the actual exposure meter.

Figure 1:
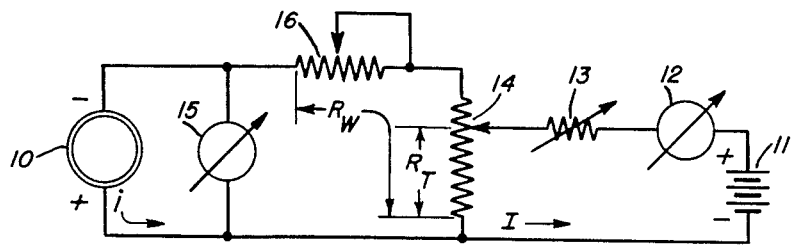
Figure 1 is a simplified circuit diagram of the apparatus.

Reference is now made to the simplified circuit diagram of Figure 1 wherein the current-generating photocell 10 constitutes the light measuring device. Light measurement is made directly in terms of illumination at the film plane by placing the photocell over the sighting aperture on the ground glass viewing screen. Generally, the sighting aperture of a metallograph device is a 1½ inch diameter clear area in the center of the ground glass screen. An arrangement designed for film-plane sighting operates at relatively low light levels but this limitation is outweighed by the fact that such system avoids separate consideration of all optical settings such as aperture opening, magnification, bellows extension, etc. Exposure calculation, then, involves only the factors of illumination, film speed and time. These factors are related as follows in terms of the well known Weston film-speed number:

$$M(\text{meter-candle-seconds}) = \frac{4}{W(\text{Weston film speed number})} \quad (1)$$

which can be rearranged to:

$$B(\text{meter-candles}) = \frac{1}{W} \times \frac{1}{T(\text{seconds})} \times 4 \quad (2)$$

One portion of my circuit comprises a battery 11, a current-indicating instrument 12, an adjustable series rheostat 13 and a rheostat 14, the circuit normally being adjusted by means of rheostat 13 to provide a constant current flow I. The other portion of my circuit comprises the photocell 10, a sensitive galvanometer 15 and the adjustable rheostat 16. It will be apparent that the reference source current I is attenuated by the shunt resistance $R_T$ and the series resistance $R_W$ (representing time and film speed, respectively) to a balance against the photocell current $i$. The balance equation, then, is:

$$i(\text{cell current}) = I \times \frac{R_T}{R_W} \quad (3)$$

and illumination may be related to cell current as:

$$i = B \times K_C \text{ (microamperes/meter-candle)} \quad (4)$$

where $K_C$ is a sensitivity constant of the photocell.

Equations 2, 3 and 4 are combined to:

$$\frac{R_W}{W} = \frac{R_T}{\frac{1}{T}} \left( \frac{1}{4 K_C} \right) \quad (5)$$

which establishes the relationship of $R_W$ and $R_T$ to film speed and time against a constant. It should be noted that $R_T$ varies as the reciprocal of time, which is convenient because time is usually less than 1 second and is expressed in fractions, whereby $R_T$ may then be linearly calibrated in terms of the denominator of the fractional second. Further, $R_W$ is the resistance of the entire attenuator 14 plus 16. This is accomplished by advancing the dial, associated with the rheostat 16, by an amount equivalent in resistance to the shunt rheostat 14 so that when rheostat 16 is actually set at zero resistance the dial indicates a figure corresponding to the full resistance of rheostat 14. The dial associated with the resistor 16 then indicates proportionally to the $R_W$ resistance including resistance 14.

Figure 2:
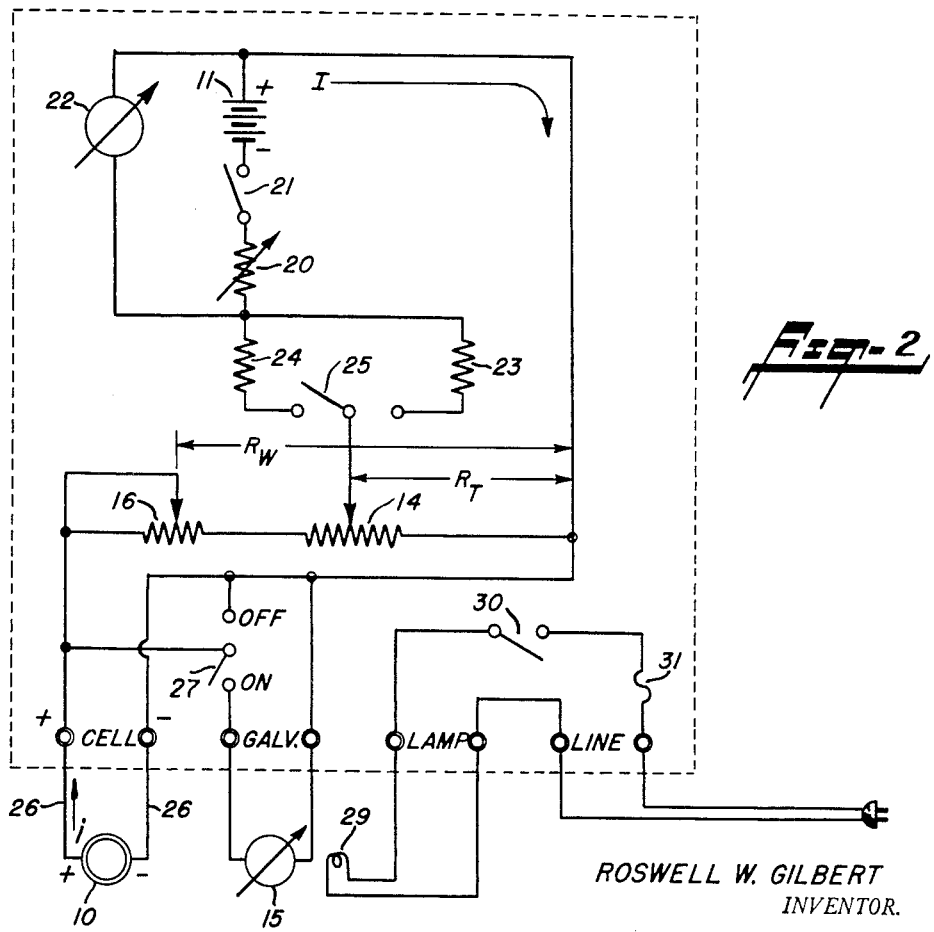
Figure 2 is a circuit diagram of a practical meter made in accordance with this invention.

Reference is now made to Figure 2 which is an actual circuit diagram of my device. The $R_W$ dial, on rheostat 16, is figured in film speed terms 0–100 with each unit of film speed equal to 100 ohms whereby the resistor 16 will vary between 0–10,000 ohms. Resistor 14 is 100 ohms and the associated $R_T$ dial is figured in two ranges, $\frac{1}{10}$ and $\frac{1}{100}$ second, corresponding to dial range of 10 and 100 respectively. The range selection is made by making the reference current I equal to 20 and 200 microamperes, respectively, for the dial settings 10 and 100. These values, together with a photocell sensitivity of 0.5 microampere per meter candle, can be substituted in Equation 5:

$$\frac{10,000 \text{ ohms}}{100} = \frac{100 \text{ ohms}}{1/1/10} \times \frac{20}{4 \times 0.5} = \frac{100 \text{ ohms}}{1/1/100} \times \frac{200}{4 \times 0.5} \quad (6)$$

which checks both time ranges of $\frac{1}{10}$ and $\frac{1}{100}$ second.

As stated hereinabove, the dial of the rheostat 16 is displaced and reads a film speed of 1 when such rheostat is actually at zero resistance. Thus, the actual film speed range of adjustment is 1 to 101 units. The reference current I is obtained from the battery 11 through the adjustable series resistor 20 upon closure of the switch 21. Such reference current is maintained at a constant, pre-selected value by setting the resistor 20 to provide a reference voltage indication on the voltmeter 22. The two values of I are obtained by adjustment of the reference voltage to 5 volts and dropping through one or the other of the fixed resistors 23, 24 as selected by closure of the switch 25. The ohmic values of these resistors 23, 24 are 25,000 and 250,000 ohms, respectively, corresponding to time settings of $\frac{1}{10}$ and $\frac{1}{100}$ second.

The time control resistor 14 and the film speed control resistor 16 are 10 turn helical rheostats, equipped with 10 turn, 1000 division dials, as is well known in this art. Actually, the time range is considered useful from $\frac{1}{100}$ second to about 10 seconds, which is 10 dial divisions from infinite time on the $\frac{1}{10}$ second range.

The apparatus and circuit enclosed within the dotted lines, in Figure 2, is housed within a suitable casing provided with suitable connection terminals or binding posts. The photocell 10 is connected to one set of terminals by means of the leads 26 which, preferably, are flexible to facilitate movement of the photocell with respect to the sighting area on the ground glass screen. The external galvanometer similarly is connected to another set of terminals and is connected into and out of the circuit by means of the switch 27. Since the light levels effective on the ground glass screen normally are very low I prefer to use a sensitive suspension galvanometer having a sensitivity of 0.01 microampere per millimeter. As is well known, such instruments include a light source focused upon a galvanometer mirror whereby the actual deflections of the galvanometer are indicated by the position of a hair line on a ground glass, calibrated dial. As shown in Figure 2, such light source 29 is energized from a 110 volt power line upon closure of the line switch 30, a suitable fuse 31 being provided for protective purposes.

It will be noted that when the switch 27 is closed in the On position the galvanometer 15 is operatively connected into the circuit. When, however, the switch is closed to the Off position the galvanometer circuit is opened and the photocell is short-circuited. For purposes of clarity the two switches 27 and 21 are shown as separate devices in Figure 2 but in the actual apparatus these switches are tied together mechanically so that a single operation controls the circuits of the battery 11, the galvanometer and the photocell.

Figure 3 shows the front panel of the casing that houses the elements enclosed within the dotted line of Figure 2, the conventional connection terminals X serving as means for connecting the external components into the circuit. The line switch 30 is used when the galvanometer is of the suspension type including a light source. The battery switch 33 is a combination of the two switches 21 and 27 shown in Figure 2 and already described, the knob 34 controls the adjustment of the adjustable resistor 20 which controls the level of the reference current, such current level being monitored by the voltmeter 22, and the switch 25 selects the time range of $\frac{1}{10}$ or $\frac{1}{100}$ second. The calibrated dials 35, 36 are associated with the helical rheostats 16 and 14, respectively, and are marked in Film Speed and Shutter Speed values, as shown.

The normal operating procedure for use of the apparatus is quite simple and may be summarized as follows:
1. Turn the battery switch 33 to On position.
2. Preset the level of the reference current by the battery rheostat 34 so that the pointer of the voltmeter 22 is alined with the reference scale mark 37 (corresponding to 5 volts),
3. Set the Film Speed dial 35 to the actual film speed value of the particular photographic film being used,
4. Focus and adjust the metallograph and place the photocell on the sighting screen,
5. Balance the galvanometer to a zero indication by adjusting the Shutter Speed dial 36,
6. Set the camera shutter in accordance with the reading of the dial 36, place the film in the camera holder and expose.

It will be apparent that an alternative procedure may be used wherein the Shutter Speed dial may be pre-set and the galvanometer balanced by adjusting the iris diaphragm on the metallograph.

While I have shown a particular embodiment of my invention, it will, of course, be understood that I do not wish to be limited thereto, since it is apparent that the principles disclosed herein are susceptible of numerous other applications, and modifications may be made in the circuit arrangements and in the instrumentalities employed without departing from the spirit and scope of my invention as set forth in the appended claim.

What I claim as new and desire to secure by Letters Patent of the United States is:

Apparatus for determining photographic exposure factors comprising a photocell positioned in the plane of the photographic film, said photocell generating a current in response to illumination; a source of substantially constant reference current; a first resistor having a pair of terminals and including a movable member that is adjustable to vary the ohmic value of the resistance across the said terminals, said movable member being associated with a scale calibrated linearly in terms of the film speed; a second resistor consisting of an element having a fixed resistance connected across a pair of terminals and a movable member slidably engaging the said element, said movable member being associated with a scale calibrated linearly in terms of the reciprocal of exposure time; leads connecting the terminals of the said first and second resistors in series across the photocell; leads connecting the said source of reference current to the movable member and one terminal of the said second resistor in a polarity sense opposite to that of the current generated by the photocell; and a null-current indicator connected across the photocell; the recited arrangement being such that an adjustment of one or both of the movable members of the resistors to produce a zero current indication of the indicator results in a condition of zero potential across the photocell in which condition the current generated by the photocell varies linearly with illumination.

References Cited in the file of this patent

UNITED STATES PATENTS

| | | |
|---|---|---|
| 1,244,159 | Asdit | Oct. 23, 1917 |
| 2,064,517 | Brice | Dec. 15, 1936 |
| 2,472,381 | McMaster | June 7, 1949 |
| 2,573,729 | Rath | Nov. 6, 1951 |